United States Patent [19]

Minami

[11] Patent Number: 4,631,936

[45] Date of Patent: Dec. 30, 1986

[54] CENTER LOCKING DEVICE OF BALL TRAIN TYPE FOR A DISC WHEEL OF MOTOR VEHICLE

[75] Inventor: Saburo Minami, Osaka, Japan

[73] Assignees: Osaka Kanagu Co., Ltd.; Speed Star Co., Ltd., both of Osaka, Japan

[21] Appl. No.: 752,730

[22] Filed: Jul. 8, 1985

[51] Int. Cl.[4] ............................................. F16B 41/00
[52] U.S. Cl. ...................... 70/167; 70/232; 70/260; 70/230
[58] Field of Search ............. 70/230, 232, 229, 259, 70/158, 163, 164, 165, 386, 167, 166; 292/252

[56] References Cited

U.S. PATENT DOCUMENTS

| | | | |
|---|---|---|---|
| 703,016 | 6/1902 | Tash | 70/230 |
| 1,625,652 | 4/1927 | Groesbeck | 70/230 X |
| 1,687,966 | 10/1928 | Baver | 70/230 X |
| 1,692,826 | 11/1928 | Ganz | 70/259 X |
| 3,534,570 | 10/1970 | Mauro | 70/230 |
| 3,552,159 | 1/1971 | Craig | 70/353 X |
| 3,824,815 | 7/1974 | Darling | 70/259 X |

FOREIGN PATENT DOCUMENTS 1567322  5/1980  United Kingdom ................. 70/232

Primary Examiner—Gary L. Smith
Assistant Examiner—Suzanne L. Dino
Attorney, Agent, or Firm—Wenderoth, Lind & Ponack

[57] ABSTRACT

A center locking device of ball train type for a disc wheel of motor vehicle. This device which is provided inside a cap nut prevents the cap nut from loosening, ensures fastening of the disc and proves to be burglar-proof.

3 Claims, 7 Drawing Figures

CENTER LOCKING DEVICE OF BALL TRAIN TYPE FOR A DISC WHEEL OF MOTOR VEHICLE

BACKGROUND OF THE INVENTION

1. Field of the Invention:

This invention relates to a center locking device of the ball train type for both locking and burglarproof purposes to be provided inside a cap nut for a disc wheel of motor vehicle.

2. Prior Art:

In the conventional disc wheel for a motor vehicle, a flange with a threaded tube is fastened to a hub of an axle, a center hole of a disc is fitted on the threaded tube, a cap nut is screwed on the screwed tube and thus the disc is fastened to the axle. As the disc is generally made of aluminum and has no clamp nut at a boss, it makes good appearance. However, since it has no center locking means, when a driver applies the brakes sharply, the cap nut is liable to become loose. Also, as it has no locking device for the cap nut, the cap nut can be removed easily and accordingly disc wheel are apt to be stolen.

SUMMARY OF THE INVENTION

The present invention has for its object to eliminate such disadvantages of the conventional disc wheels for a motor vehicle as stated above. It provides a locking device of the ball train type inside a cap nut in order to prevent disc wheels from loosening and from being stolen.

BRIEF EXPLANATION OF THE DRAWINGS

The nature and advantages of the present invention will be understood more clearly from the following description made with reference to the accompanying drawings, in which.

DETAILED EXPLANATION OF THE INVENTION

Figure 1:
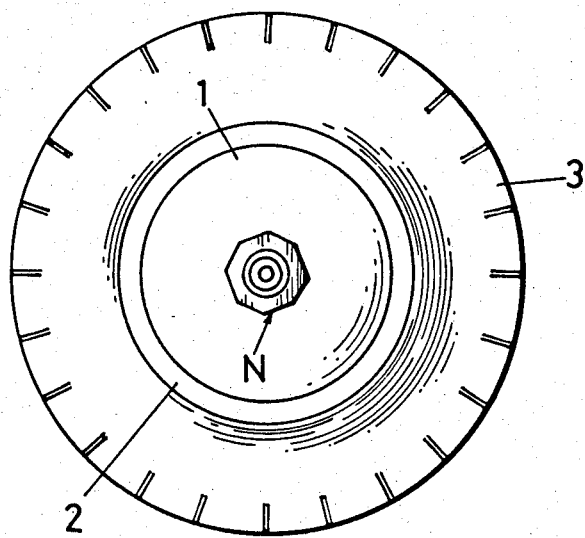
FIG. 1 is a front view of a disc wheel.
Figure 2:
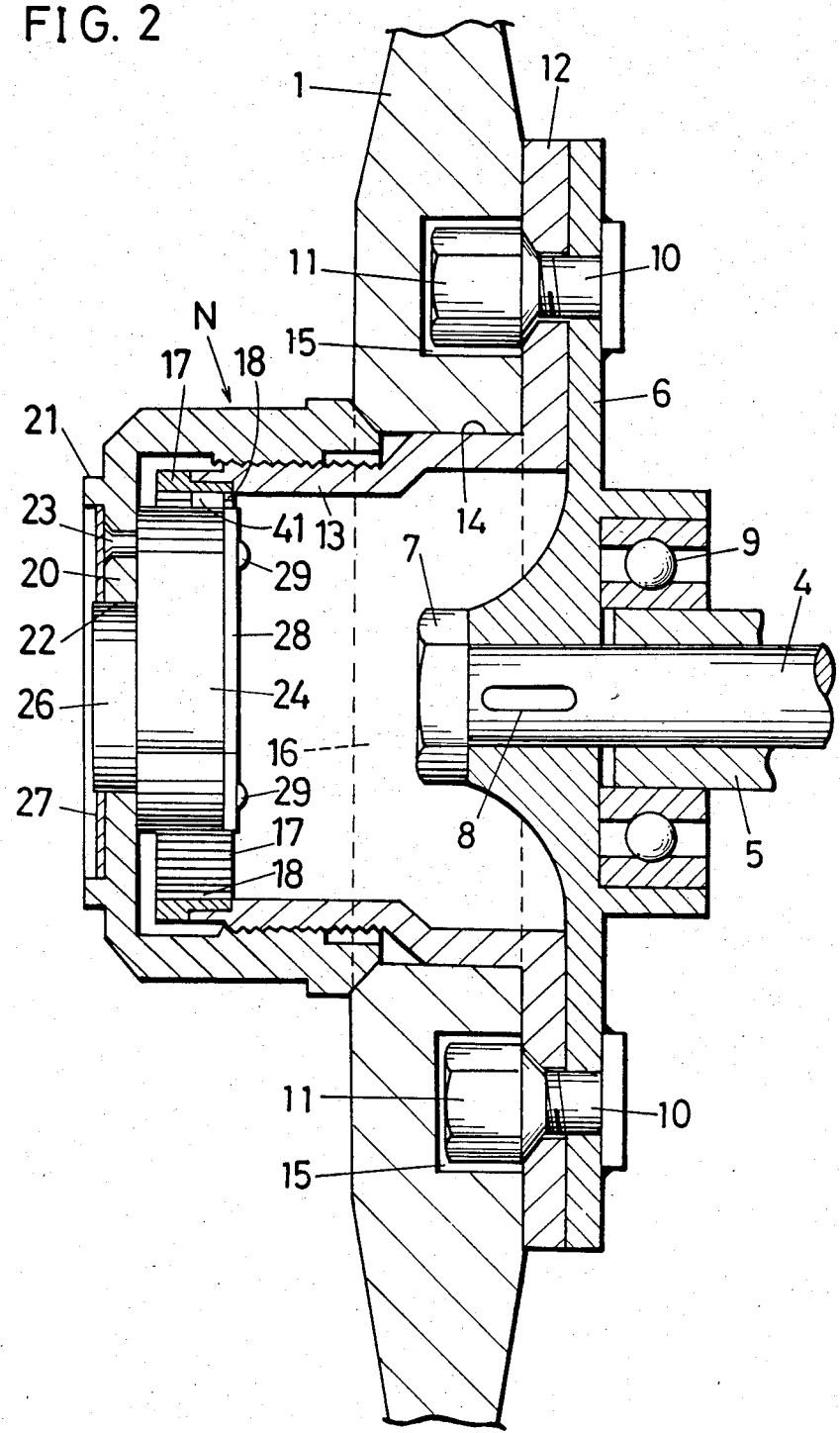
FIG. 2 is a cross sectional view of a central part of the disc wheel with the lacking device thereon.

In FIG. 1 and FIG. 2, numeral 1 denotes an aluminum disc. A tire 3 is mounted on a rim 2 fitted to the circumferential edge of the disc 1, which is connected to an axle 4 by only a cap nut N. The axle 4 is surrounded by a tubular housing 5. A boss of a hub 6 is fitted on an end of the axle 4 and both are connected together by a bolt 7 and a key 8. One end of the housing 5 is inserted in a recess inside the boss and ball bearings 9 are interposed therebetween. The hub 6 is supported to the end of the housing 5 by these ball bearings 9. Four clamping bolts 10 welded to the inner surface of the hub 6 project from the outside surface. Numeral 12 designates an annular flange having a threaded tube 13 integral therewith. A clamping bolt 10 extends through each of four holes of the annular flange 12, which is fastened to the hub 6 integrally by clamp nuts 11. The tube 13 has a left-handed thread on its outer circumferential surface but is made slightly thicker and is unthreaded at its base part 14. As the disc 1 is made of aluminum, it is made thicker at its boss part to improve its strength and four recesses 15 are provided on the inner side of the boss at uniformly spaced circumferential positions corresponding to the positions of the bolts 10.

A center hole 16 of the disc 1 is fitted on the unthreaded part 14 of the tube 13 and the inner side of the boss is contacted tightly with the flange 12. The clamp nuts 11 are received in the recesses 15. The cap nut N is threaded onto the tube 13 to press the tapered surface of its end against the tapered surface of the center hole 16. The boss of the disc 1 is fastened tight against the flange 12 connected to the hub 6 of the axle 4 by the cap nut N so that the disc 1 is connected to the axle 4. As the threaded tube 13 has left-handed threads and the cap nut N is threaded onto the former, the cap nut N is locked relative to clockwise rotational direction of the wheel. It is also practicable that the tube 13 have right-handed threads and the cap nut N will be locked relative to counterclockwise rotation of the wheel.

The present invention is to incorporate a center locking device of ball train type for locking and burglarproof purposes in the cap nut of the disc wheel.

In embodiment shown in FIG. 2-FIG. 5, numeral 17 denotes an inner gear ring having on its whole inner periphery saw-tooth like pawls 18. This inner gear ring 17 is fixed to the outer end of the tube 13 by inserting three projections 19 at its outer edge into cuts in the tube 13 and by caulking the cuts. It is possible to form the inner gear ring 17 by making an annular thicker part at the inner peripheral surface at the outer end of the screwed tube 13 and forming the thicker part into the inner gear ring 17 by processing it by a broaching machine.

The cap nut N is of octagonal shape. An annular member 21 protrudes from the circumferential rim of an end plate 20 and a hole 22 is provided at the center of the end plate 20. Three countersinks are made around the hole 22. Numeral 24 is a locking device proper to be incorporated in the cap nut N. It is thick and substantially equilateral triangular in shape and has a hole 25 at its center, with its apexes being arcuate. An annular member 26 protrudes from the central part of the locking device proper 24 and is fitted in the hole 22 of the end plate 20. Three short protrusions 23 on the front of the locking device proper 24 are put in corresponding countersinks of the end plate 20 and the outer ends of the short protrusions 23 are caulked, whereby the locking device proper 24 is fixed to the inner surface of the end plate 20 of the cap nut N and the three arcuate apexes face the inner gear ring 17. Numeral 27 designates a seal plate connected to the end plate 20 and has at its center a round hole in which the annular member 26 of the locking device proper 24 is inserted. It is received in the inside of the annular member 26 of the end plate 20 and is fixed with an adhesive to the front surface of the end plate 20 to make the cap nut N better in appearance.

A recess 30 of round shape is made at the center of the back surface of the locking device proper 24. The whole back surface of the locking device proper 24 is covered with a back lid 28 which is fixed by three screws 29. Three curved guide grooves 31, each extending from the recess 30 toward a corresponding apex of the locking device proper 24, are in the shape of three huge commas. A split groove 32 is provided at the terminal end of each guide groove 31, at a right angle thereto. The outer end of each split groove 32 is opened to the apex of the locking device proper 24. Numeral 33 designates a thick cam received in the recess 30 of the locking device proper 24. This cam has a central square hole 34 and at its circumferential edge has three recesses 35 and three projections 36 alternating with the recesses. A square-shaped outer end of a mandrel 57 projecting from the back surface of a key disc (to be explained later) is fitted in the square center hole of the cam 34 and is caulked. A projection (not shown in the drawing) made at the inner end surface of the cam is fitted in a fan-shaped groove (not shown in the drawing) made in the recess 30 of the locking device proper 24 so as to limit the revolving angle of the cam 33 to about 90°. Numerals 37-40 are four balls constituting a ball train received in each guide groove 31. The ball 40 at the head of a train projects into the split groove 32 by about half the diameter thereof by being pushed by a projection 36 of the cam, but when the cam 33 turns by about 90°, the ball 37 at the innermost enters the inmost part of the recess 35 of the cam 33, whereupon the ball 40 at the head retreats into the guide groove 31.

Numeral 41 designates a slightly curved leaf spring member with small projections 42 on both sides of its inner end and on such spring is received in each of the three split grooves 32. The small projections 42 are loosely fitted in a small square hole 43 at the innermost end of the split groove and a cut (not shown in the drawing) in the back lid 28 so that the leaf spring member 41 can slide in the split groove 32 with two projections 42 as fulcrums. Numeral 45 designates a recess at the central part of each split groove, in which a push spring 46 is fitted so as to press against the back surface of the leaf spring member 41. When the projection 36 of the cam 33 pushes the ball 37 at the innermost end of the train, the ball 40 at the head pushes the leaf spring member 41, whereby the forward end of the leaf spring member 41 is projected from the apex edge of the locking device proper 24 and is engaged with the pawl 18 of the inner gear ring 17. By this engagement, revolution of the cap nut N is checked. When the cam 33 turns by about 90° and the inmost ball 37 enters the inmost part of the recess 35 of the cam 33, the push spring 46 pushes back the leaf spring member 41 and the train of balls 37-40, whereupon the leaf spring member 41 disengages from the inner gear ring 17 and retreats into the locking device proper 24. Thus, the cap nut N is made revolvable. Since the leaf spring member 41 has elasticity, when its forward end engages with the pawl 18 of the inner gear ring, there is no danger of the leaf spring member 41 being broken.

An embodiment of a magnet lock L to be used for the device according to the present invention is explained below.

Figure 3:
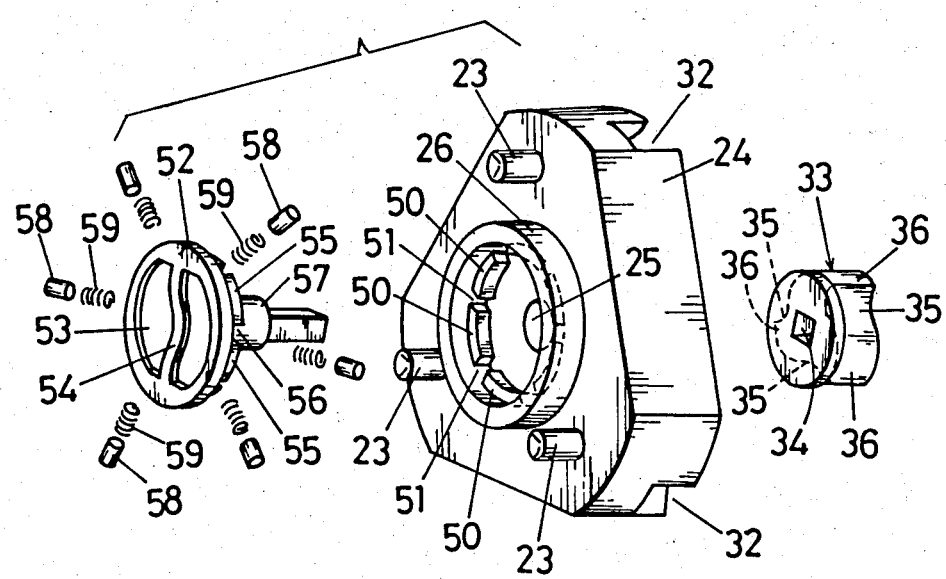
FIG. 3 is an exploded perspective view of parts of the lacking device.
Figure 4:
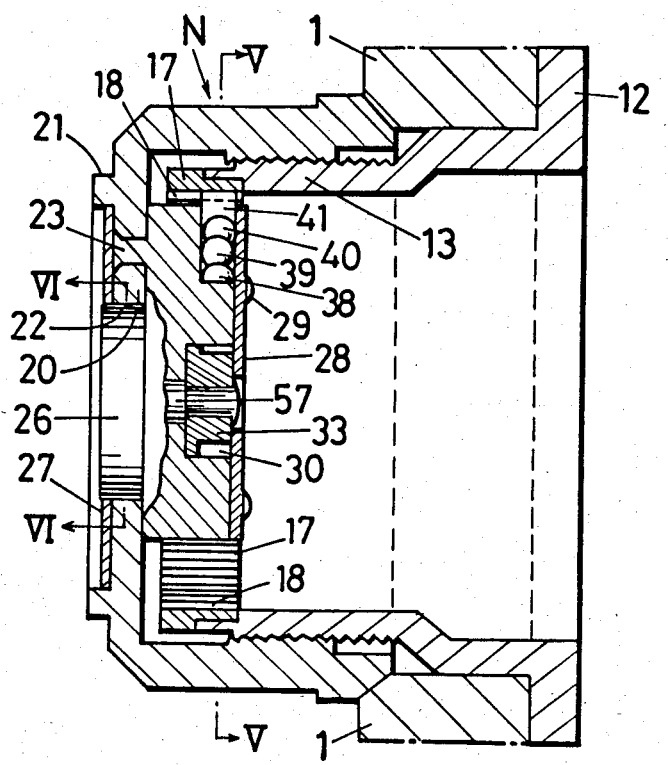
FIG. 4 is a cross sectional view of a cap nut portion with the locking device, on an enlarged scale.
Figure 5:
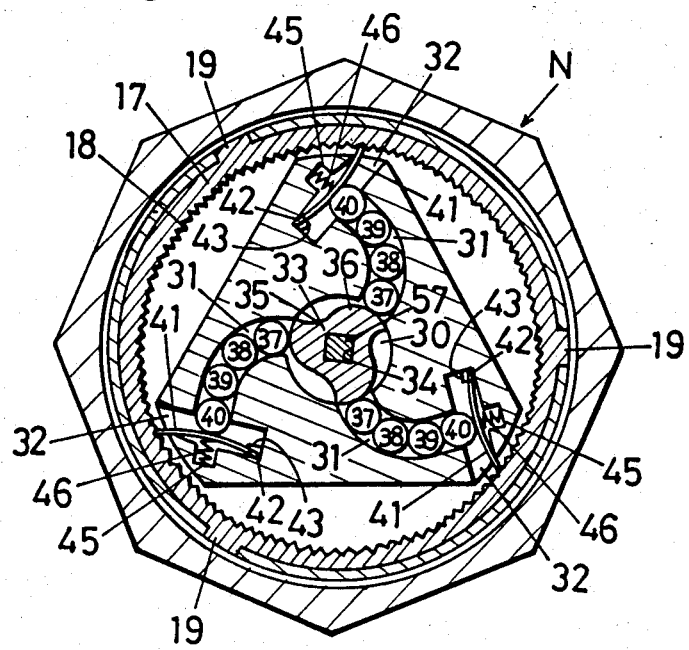
FIG. 5 is a sectional view of the cap nut portion, taken along the line V—V in FIG. 4.
Figure 6:
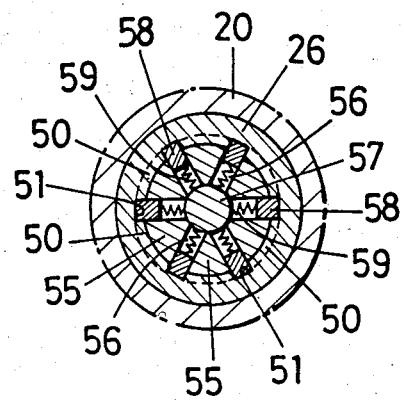
FIG. 6 is a sectional view of the cap nut portion, taken along the line VI—VI in FIG. 4.

As shown in FIGS. 3, 4 and 6, along the inner circumferential surface of the annular member 26 of the locking device proper 24, a protrusion 50 (about half as thick as the annular member 26) is provided. This protrusion 50 is divided into six parts so as to provide six recesses 51 at equal intervals or at equal angles of 60°. Numeral 52 designates a key disc to be put in the annular member 26 and has at its front surface a concave recess 53 (scooped out) and a projection 54 in vertical direction and at its back surface six triangular projections 55 at equal intervals. These projections 55 are fitted revolvably inside the protrusions 50 of the annular member 26. The key disc 52 has six radial grooves 56 (defined between the projections 55) which extend in a radial direction and are arranged at equal angles of 60°. The width of this groove 56 substantially corresponds to the width of the recess 51.

A mandrel 57 which projects from the back surface of the key disc 52 extends through the center hole 25 of the locking device proper 24 and the key disc 52 is prevented from slipping off by the cam 33 fixed to the cut square end of the mandrel 57 and is held revolvably in relation to the end plate 20 of the cap nut N. Numeral 58 designates a short magnet of round rod shape. Six magnets 58 are inserted, together with springs 59, in the six grooves 56 and accordingly are arranged at equal angles of 60°. A magnet lock L composed by the magnets 58, springs 59 and the key disc 52 is set in the locking device proper 24 which is fitted to the inner surface of the end plate 20 of the cap nut N. Each magnet 58 is always pushed by the spring 59 and projects its outer end into the recess 51 made in the annular member 26. The magnets connect the key disc 52 to the locking device proper 24, thereby checking the revolution of the key disc 52 and placing the device in the locked state. By changing the number of magnets and by changing the directions of N pole and S pole, key variations can be obtained.

Figure 7:
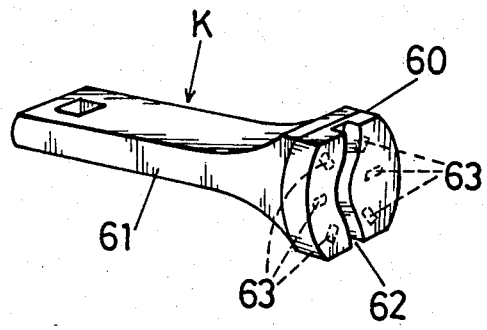
FIG. 7 is a perspective view of a key.

As shown in FIG. 7, the key comprises a main piece 60 and a grip 61. The main piece 60 is so shaped as to be fitted in the recess 53 of the key disc 52. A groove 62 extending in the vertical direction which corresponds to the projection 54 of the key disc 52 is provided in the front of the main piece 60 and the position at which the key is used is controlled by the curve direction of the projection 54 and the groove 62. Six small magnets 63 of round rod shape are embedded in the main piece 60 extending in the radial direction. These magnets 63 are arranged in such a fashion that they oppose the magnetic poles of the magnets 58 in the key disc and are shifted toward the center side by the distance corresponding to the recess 51, in relation to the magnets 58 in the key disc.

When the main piece 60 of the key K is fitted in the recess 53 of the key disc to engage the groove 62 with the projection 54, the magnets 58 in the key disc are attracted by the magnets 63 of the key K and shift toward the center of the key disc against the force of the springs 59, slipping out of the recesses 51 in the annular member 26. Thus, the key disc 52 is made revolvable. As this key disc 52 revolves with the magnets 58, it is not necessary to restrict the revolving angle of the key disc within the space between magnets as in the case of the conventional magnet lock.

An embodiment of the present invention is composed a described above, namely, the annular flange 12 having the threaded tube 13 is fastened integrally to the hub 6 of the axle 4; the center hole 16 of the disc is fitted on the unthreaded part 14 of the tube to make the inside surfce of the boss contact tightly the flange 12; the clamp nut 11 is put in the recess 15 to check revolution of the disc; the cap nut N is threaded to the screwed tube 13 to press the tapered surface of its inner end against the tapered surface of the center hole 16 of the disc, thereby fastening the boss of the disc tightly by the flange 12 and the cap nut N and consequently connecting the disc wheel 1 to the axle 4.

When the cap nut N is fitted or removed, the recess 35 of the cam is made to face the inmost ball 37, whereupon the push spring 46 pushes back the leaf spring member 41 and a train of balls 37–40 and forces the ball 40 at the head of a train into the guide grooves 31. As a result, the forward end of the leaf spring member 41 disengages from the inner gear ring 17 and the cap nut N is made revolvable. At this time, the magnets 58 of the key disc are pulled out of the recesses 51 in the annular member 26 of the locking device proper 24 and thus the magnet lcok L is in an unlocked state.

When the fastening of the disc is finished, the main piece 60 of the key K is fitted in the recess 53 of the key disc to engage the groove 62 with the projection 54, whereupon the magnets 58 in the key disc 52 are shifted toward the central part and the key disc 52 is made revolvable. When the key is turned by about 90°, the key disc 52 and its numeral 57 are also turned by about 90°. Thus, the mandrel 57 turns the cam 33 by about 90°, whereupon the projections 36 of the cam 33 push the inmost balls 37 and through the medium of the trains of balls 37–40, the ball 40 at the head of each row pushes the corresponding leaf spring member 41 and projects the forward end of the leaf spring member 41 from the locking device proper 24. Thus, the forward ends of the three leaf spring members 41 are engaged with the pawls 18 of the inner gear ring. If the key K is removed, the magnets 58 in the key disc are pushed by the springs 59 and move into the recesses 51 of the annular member 26 and therefore revolution of the key disc 52 is checked and the magnet lock L is put in the locked state, with the result that engagement of the leaf spring member 41 with the inner gear ring 17 is ensured. As a result, the revolution of the cap nut N is checked and therefore the cap nut N which has once been screwed onto the threaded tube 13 and has fastened the disc 1 is prevented from loosening during running of a motor vehicle and is also prevented from being removed for stealing a disc wheel.

In cases where a disc wheel is to be replaced, the main piece 60 of the key K is fitted in the recess 53, whereby the magnets 63 in the key disc are attracted by the magnets 58 of the key K and the magnets 63 are pulled out of the recesses 51 in the annular member 26 to make the key disc 52 rotatable. Then, if the key K is turned by about 90°, the key disc 52 and its mandrel 57 are also turned by about 90°, whereupon the mandrel 57 turns the cam 33 by about 90° and makes its recesses 35 face the inmost balls 37, whereupon the push springs 46 push back the leaf spring members 41 and the rows of balls 37–47 disengage the leaf spring members 41 from the inner gear ring 17. In this state, if the key K is taken off, magnets 58 in the key disc 52 make contact with protrusions 50 in the annular member 26 and the magnet lock L is maintained in the unlocked state. Therefore, the cam 33 is maintained in the state that its recesses 35 receive the inmost balls 37 therein and even if the key K is taken off, the leaf spring members 41 are maintained in the state with the forward ends disengaged from the pawls 18 of the inner gear ring. Then, the cap nut N is taken off the tube 13 by a spanner, the disc 1 is pulled off the unthreaded part 14 of the tube 13 and the disc wheel is replaced. When the disc wheel is replaced and the cap nut N is screwed again onto the tube 13, the magnet lock L is kept in the unlocked state so that the cap nut N is easy to turn. After the cap nut N is screwed on fully by hand and fastened by a spanner, the key K is put upon the key disc 52 and is turned by about 90°, whereby the magnet lock L is locked and the projections 36 of the cam 33 push the inmost balls 37. As a result, the leaf spring members 41 project from the locking device proper 24 and engage with the pawls 18 of the inner gear ring. Thus, the revolution of the cap nut N is checked.

The foregoing is an explanation of one embodiment of the present invention. However, this invention is not limited to this embodiment but can be changed in design within the range of the gist of the present invention. For example, the present invention can be applied to an ordinary steel disc. It is also possible to shape the locking device proper 24 in a square shape, for example, with four corner parts made arcuate and to increase the number of leaf spring members 41 and the number of guide grooves 31. The magnet lock can be replaced by a cylinder lock and it is also possible to increase or decrease the number of magnets of the magnet lock or to use magnets which are rectangular parallelepiped with corners made round.

According to the present invention, in the disc wheel of motor vehicle wherein the disc is connected to the axle only by a cap nut, an inner gear ring is provided at the end of a threaded tube to which a cap nut is screwed, a locking device proper in which a magnet lock or a cylinder lock is incorporated is fitted to the end plate of the cap nut, a central recess, guide grooves extending from the central recess and split grooves substantially at a right angles to the guide groove are provided at the back surface of the locking device proper, a slidable leaf spring member and a push spring are provided in each split groove, and by a cam received in the central recess the forward end of the leaf spring member is engaged with the inner gear ring, through the medium of a train of balls in the guide groove. Under this arrangement, loosening of the cap nut can be prevented, fastening of the disc can be ensured, and the loosening of the disc wheel of a motor vehicle and theft of it can be prevented.

What is claimed is:

1. A center locking device of the ball train type for a disk wheel which is connected to an axle by a flange with a threaded tube thereon and a cap nut, said locking device comprising:

an inner gear ring having pawls on its inner peripheral surface and integral with an end of the threaded tube;

a locking member mounted on the inner surface of the end plate of the cap nut, the locking member having arcuate peripheral portions corresponding to the shape of the inner gear ring, said locking member having a central recess therein and guide grooves extending from said central recess toward the periphery thereof and split groove at the outer end of each of the guide grooves and open at one end to a corresponding arcuate peripheral portion of the locking member;

a cam rotatably positioned in said central recess and having a plurality of recesses corresponding to the number of guide grooves and a plurality of projections corresponding to the number of guide grooves alternately spaced around said cam;

a plurality of balls in a train in each guide groove;

a leaf spring member positioned in each split groove and a push spring in each split groove engaged with the leaf spring for urging the leaf spring from a first position where one end of the leaf spring projects out of said split groove to engage a pawl on the inner periphery of said ring gear, and the ball on the outer end of the train of balls engaging with the leaf spring, when the train of balls is urged outwardly, to a second position in which the one end is withdrawn from the pawl when the train of balls is freed to move inwardly, whereby when said cam is rotated for causing the projections thereon to urge said trains on balls outwardly in said guide grooves, the one ends of said leaf springs are engaged with the pawls on the inner gear ring to block rotation of the cap nut, and when said cam is rotated for freeing the innermost balls of said trains of balls to move into the recesses in said cam, the leaf springs are urged by said push springs to disengage from said inner gear ring to free said cap nut; and locking means having a rotating member connected to said cam for rotating said cam when said locking means is unlocked.

2. A center locking device as claimed in claim 1 in which said locking means is magnetic locking means.

3. A center locking device as claimed in claim 1 in which said guide grooves are curved in the radial direction.

* * * * *